United States Patent [19]

Gaskill et al.

[11] Patent Number: 4,811,036

[45] Date of Patent: Mar. 7, 1989

[54] PRINTING APPARATUS AND PRINT HEAD MOUNTING ASSEMBLY THEREFOR

[75] Inventors: David M. Gaskill, Providence; Paul V. Iannucci, North Providence, both of R.I.

[73] Assignee: Astro-Med Inc., West Warwick, R.I.

[21] Appl. No.: 81,712

[22] Filed: Aug. 3, 1987

[51] Int. Cl.[4] .............................................. G01D 15/10

[52] U.S. Cl. ................................ 346/76 PH; 219/216

[58] Field of Search .................. 346/76 PH, 105, 106; 219/216 PH; 400/120, 902; 355/23, 24

[56] References Cited

U.S. PATENT DOCUMENTS

| | | | |
|---|---|---|---|
| 3,720,954 | 3/1973 | Czyryk | 346/106 |
| 4,261,661 | 4/1981 | Thiers | 355/24 |
| 4,468,677 | 8/1984 | Schonfeld | 219/216 PH |
| 4,506,272 | 3/1985 | Arai | 219/216 PH |
| 4,642,658 | 2/1967 | Arakawa | 346/76 PH |
| 4,660,053 | 4/1987 | Tsutsumi et al. | 346/76 PH |
| 4,723,137 | 2/1988 | Playe | 346/105 |

*Primary Examiner*—E. A. Goldberg
*Assistant Examiner*—M. M. Lateef
*Attorney, Agent, or Firm*—Salter & Michaelson

[57] ABSTRACT

A printing apparatus is operative for applying images to the opposite sides of continuous strips at first and second printing stations. The apparatus includes a feed assembly driven by a stepping motor for advancing a continuous strip from the first reprinting station to the second printing station and a controller which is responsive to a predetermined number of stepped rotational increments of the stepping motor for coordinating the printing operation at the second printing station with the printing operation at the first printing station. The preferred form of the apparatus is operative with thermal print heads, and it includes head mounting assemblies which are operative with toggle-like actions between actuated and unactuated positions.

11 Claims, 4 Drawing Sheets

PRINTING APPARATUS AND PRINT HEAD MOUNTING ASSEMBLY THEREFOR

BACKGROUND AND SUMMARY OF THE INVENTION

The instant invention relates to printing apparatus and more particularly to an apparatus for applying images to opposite sides of a continuous strip at spaced printing stations and to a print head mounting assembly for the apparatus.

A number of different types of printing apparatus have been heretofore available for applying images to the opposite sides of continuous strips. In this regard, heretofore printing apparatus of this general type have been widely available and have been used for a variety of applications, including printing continuous strips of labels, tags, and the like for retail sales applications. However, it has been found that it can be extremely difficult to coordinate the printing operations which take place at the different printing stations of apparatus of this type to assure that the longitudinal positions of the images which are applied to the opposite sides of continuous strips are properly oriented with respect to each other. It has also been found that errors in the longitudinal positions of the images which are applied to the opposite sides of continuous strips often tend to be cumulative so that the effects of minute errors are greatly magnified during prolonged printing processes.

The instant invention provides an effective printing apparatus which overcomes the above described difficulties of the heretofore available printing apparatus for applying images to the opposite sides of continuous strips. Specifically, the instant invention provides an apparatus for applying images to the opposite sides of a continuous strip so that the longitudinal positions of the images are precisely coordinated along substantially the entire extent of the strip. More specifically, the apparatus of the instant invention comprises first printing means actuatable for applying a first image to a first side of a continuous strip at a first printing station, second printing means actuatable for applying a second image to the opposite or second side of the continuous strip at a second printing station which is a predetermined distance from the first printing station, and drive means including a rotatable drive roller for longitudinally advancing the continuous strip so that it passes in a substantially taut disposition from the first printing station to the second printing station upon rotation of the drive roller. The apparatus further comprises stepping motor means rotatable at a predetermined rate of stepped rotational increments per revolution for rotating the drive roller to advance the strip and control means operative for actuating the first and second printing means to apply images to the opposite sides of the strip, the control means being responsive to a predetermined number of stepped rotational increments of the stepping motor means which corresponds to the distance between the first and second printing stations for coordinating the longitudinal positions of the images which are applied to the strip at the first and second printing stations. The apparatus of the instant invention is preferably embodied as a thermal printing apparatus, and the first printing means preferably comprises a first thermal print head at the first printing station and means for advancing a first thermal printing film to the first printing station so that the first printing film is interposed in engagement between the first thermal print head and the first side of the strip at the first printing station. The second printing means preferably comprises a second thermal print head at the second printing station and means for advancing a second thermal printing film to the second printing station so that the second thermal printing film is interposed in engagement between the second thermal print head and the second side of the strip at the second printing station. The first and second printing means preferably comprises first and second platens at the first and second printing stations, respectively, and means biasing the first and second print heads toward the first and second platens, respectively. Further, the strip and the first thermal printing film pass between the first print head and the first platen at the first printing station, and the strip and the second printing film pass between the second print head and the second platen at the second printing station.

The preferred form of the apparatus of the instant invention which is embodied as a thermal printing apparatus further comprises first and second print head mounting assemblies for mounting the first and second thermal print heads, respectively, so that they are biased toward the first and second platens, respectively, at the first and second printing stations, respectively. The mounting assemblies preferably each comprise toggle means including at least two pivotably connected toggle elements which are alternatively positionable in actuated positions wherein they are releasably secured in substantially aligned relation and unactuated positions wherein they are in nonaligned relation and freely pivotable with respect to each other. Each of the mounting assemblies preferably further comprises biasing means communicating with the print head thereof through the toggle elements thereof when the toggle elements are in the actuated positions thereof for biasing the print head thereof toward its respective platen. Each of the mounting assemblies preferably further comprises a mounting frame which is pivotably mounted in the printing apparatus, and the print head of each of the mounting assemblies is mounted on the mounting frame thereof so that it is pivotable therewith away from its respective platen when the toggle elements thereof are in the unactuated positions thereof. Still further, the preferred form of the apparatus preferably comprises means responsive to movement of the toggle elements thereof from the actuated positions to the unactuated positions for advancing the respective thermal printing film thereof a predetermined amount so that the film is maintained in a substantially taut disposition when the toggle elements are moved to the unactuated positions thereof.

It has been found that the printing apparatus of the instant invention has specific advantages over the heretofore available printing apparatus. Specifically, the printing apparatus of the instant invention is operative for applying images to opposite sides of a continuous strip so that the longitudinal positions of the images are precisely coordinated along substantially the entire longitudinal extent of the strip. In this regard, the apparatus of the instant invention is operative with stepping motor means which is rotatable at a predetermined rate of stepped rotational increments per revolution for rotating the drive roller to advance the strip through the apparatus. The stepping motor means is inherently self-correcting on each revolution so that each revolution of the stepping motor includes exactly the same number of stepped rotational increments. Further, the means responsive to the stepping motor means for actuating the first and second printing means is responsive to a predetermined number of stepped rotational increments which corresponds to the distance between the first and second printing stations. Accordingly, the apparatus is operative for precisely coordinating the positions of the images which are applied to the opposite sides of a strip; and since the means for actuating the printing means is responsive to a predetermined number of stepped rotational increments rather than a predetermined passage of time, the apparatus is operative without cumulative errors in the longitudinal positions of the images.

The mounting assembly of the instant invention also has significant advantages over the heretofore available mounting assemblies for thermal printing apparatus. Specifically, the mounting assembly of the instant invention is operative with a toggle action between an actuated position wherein the print head thereof is biased toward the adjacent platen and an unactuated position wherein the print head thereof is moved away from the platen and the biasing means is released so that the print head is freely movable. Further, the apparatus includes means for advancing a thermal printing film a predetermined amount when the respective toggle members thereof are moved to the unactuated positions. Accordingly, when the toggle members are moved to the unactuated positions thereof, the thermal printing film is maintained in a taut disposition to provide clear access to the respective printing station.

Accordingly, it is a primary object of the instant invention to provide a printing apparatus for applying images to the opposite sides of a continuous strip wherein the longitudinal positions of the images on the opposite sides of the strip are precisely coordinated.

Another object of the instant invention is to provide a printing apparatus for applying images to the opposite sides of a continuous strip wherein the strip is advanced between first and second printing stations utilizing a stepping motor driven advancement system.

A still further object of the instant invention is to provide an improved print head mounting assembly for a thermal printing apparatus.

An even further object of the instant invention is to provide an effective thermal print head mounting assembly which is movable to an unactuated position for moving a print head away from its respective platen.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
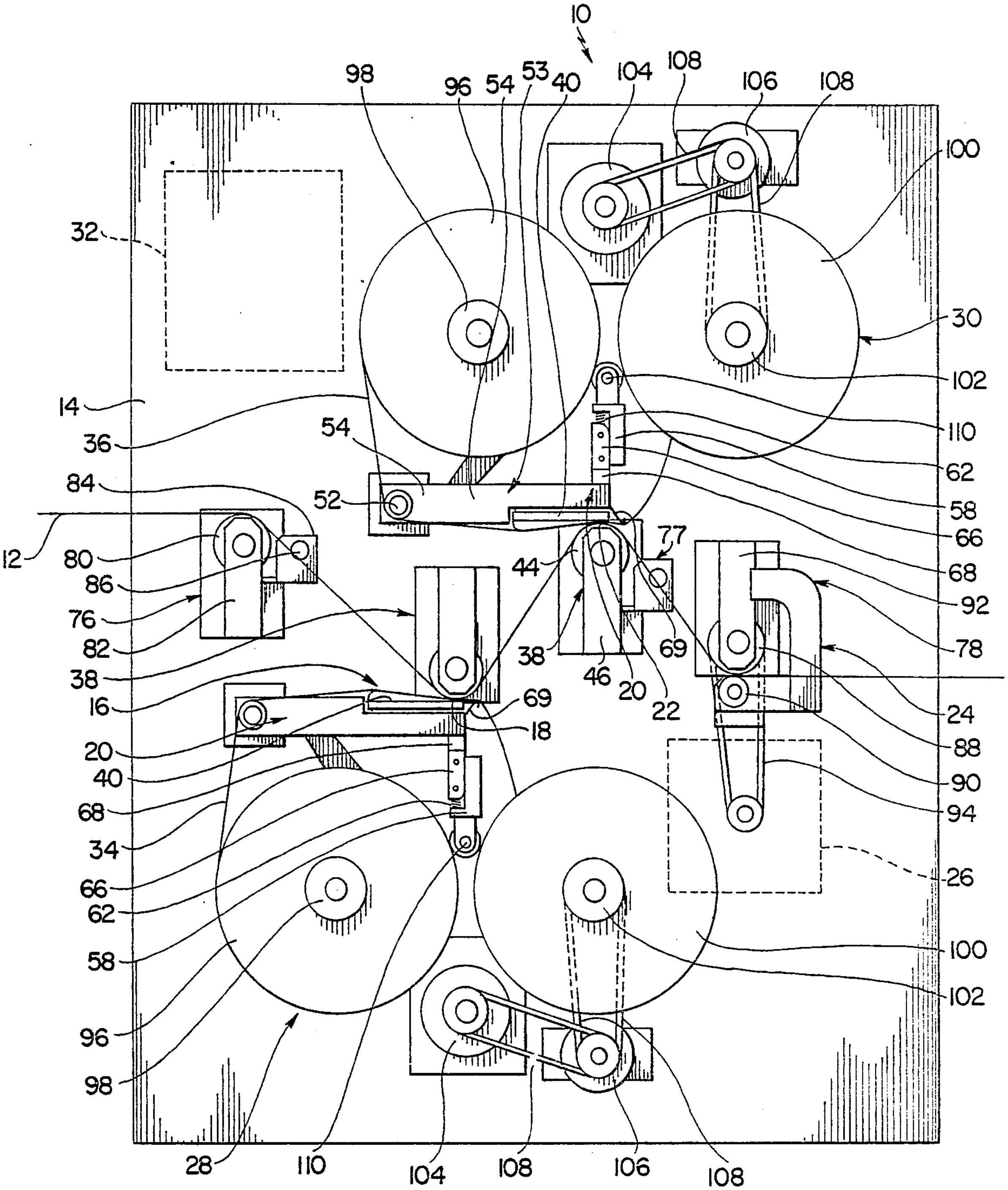
FIG. 1 is a front elevational view of the apparatus of the instant invention.
Figure 2:
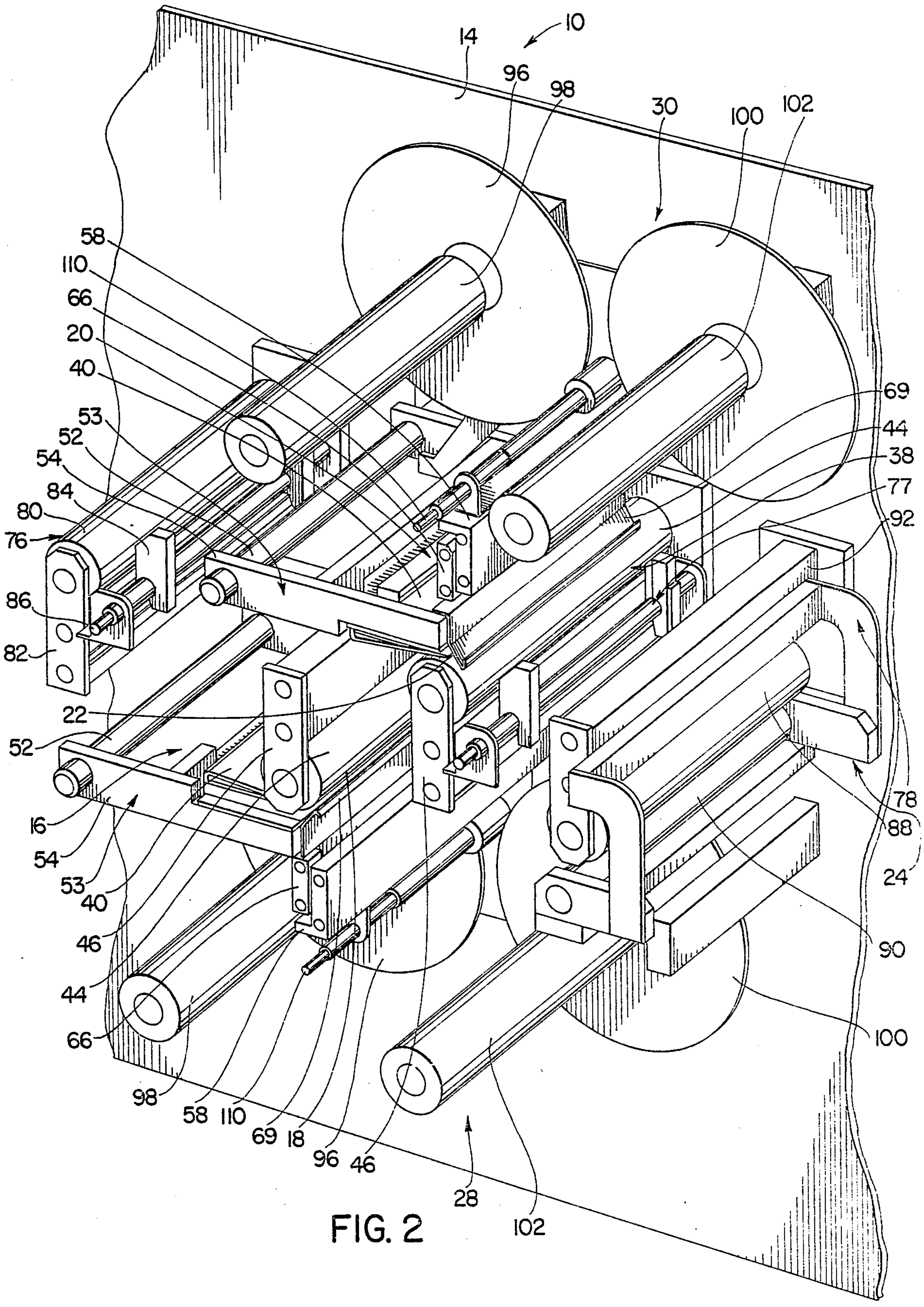
FIG. 2 is a front perspective view thereof.

Referring now to the drawings, the apparatus of the instant invention is illustrated and generally indicated at 10 in FIGS. 1 and 2. The apparatus 10 is operative for applying images to opposite first and second sides of a continuous strip 12, and it includes a back plate or base 14, a first printing assembly generally indicated at 16 which is operative at a first printing station 18, a second printing assembly generally indicated at 20 which is operative at a second printing station 22, and a feed assembly generally indicated at 24. The apparatus 10 further comprises a stepping motor 26, a first printing film drive assembly 28, a second printing film drive assembly 30, and a controller 32. During operation of the apparatus 10, the first and second printing film drive assemblies 28 and 30, respectively, are operated to supply first and second printing films 34 and 36, respectively, to the first and second printing stations 18 and 22, respectively, and the stepping motor 26 is operated to drive the feed assembly 24 so that the strip 12 is advanced in a substantially taut disposition between the first and second printing stations 18 and 22, respectively. The controller 32 is responsive to a predetermined number of stepped rotational increments of the stepping motor 26 for controlling the print head assemblies 16 and 20 to apply images to the opposite sides of the strip 12 so that the longitudinal positions of the images on the opposite sides of the strip 12 are precisely coordinated throughout the longitudinal extent of the strip 12 as will hereinafter be more fully set forth. Further, it will be understood that although apparatus 10 as herein embodied comprises a thermal printing apparatus, the basic concept of the instant invention, i.e., the concept of coordinating different printing stations by responding to a predetermined number of rotational increments of a stepping motor, is equally applicable to other types of printing apparatus.

The strip 12 preferably comprises a paper or nonwoven fabric substrate having a thickness of up to 0.010 inch and a width of between 1 and 4 inches.

The base 14 comprises a substantially rigid back plate which is mounted in a substantially vertical disposition for providing a supporting structure for the print head assemblies 16 and 20, the feed assembly 24, the stepping motor 26, the film drive assemblies 28 and 30, and the controller 32.

Figure 3:
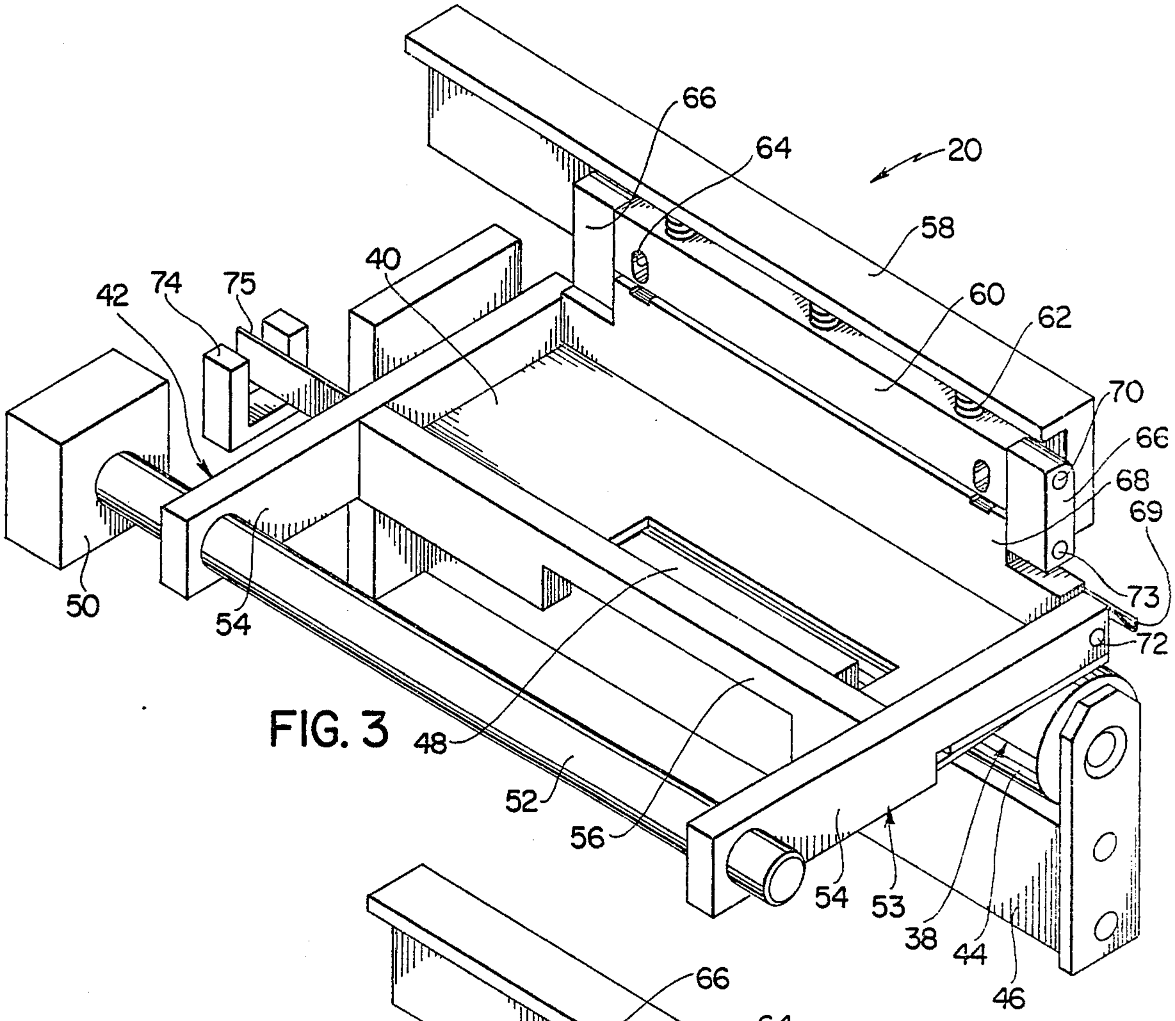
FIGS. 3 and 4 are perspective views of a print head mounting assembly of the apparatus in the actuated and unactuated positions thereof respectively.
Figure 4:
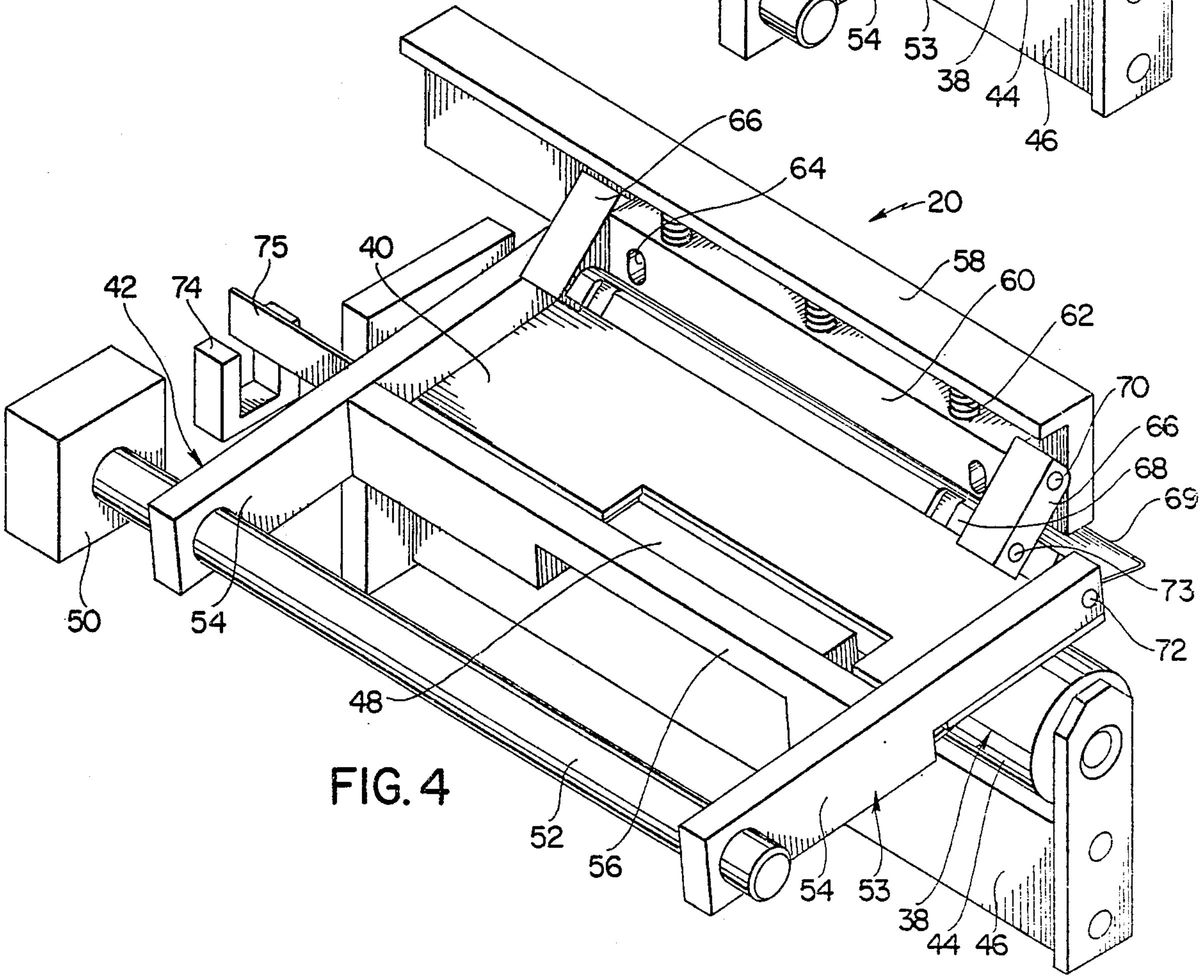

Referring now to FIGS. 3 and 4, the second printing assembly 20 is more clearly illustrated. The second printing assembly 20 comprises a platen assembly generally indicated at 38, a thermal print head 40 and a thermal print head mounting assembly generally indicated at 42. The platen assembly 38 comprises a cylindrical platen 44 having a rubberized outer shell and a platen mounting bracket 46 which is operative for rotatably mounting the platen 44 on the base 14 as illustrated in FIG. 2. The print head 40 preferably comprises a conventional thermal print head including a ceramic substrate and a plurality of selectively energizable discrete thermal elements which are disposed in a predetermined array. The print head 40 includes a connector housing 48 through which the print head 40 is electrically connected to the controller 32 by a ribbon cable (not shown).

The print head mounting assembly 42 is operative for mounting the print head 40 in substantially parallel relation to the platen 44 so that it is movable between the actuated position illustrated in FIG. 3 and the unactuated position illustrated in FIG. 4. In this regard, the print head mounting assembly 42 comprises a pivot bar mounting block 50 which is mounted on the base 14 and a pivot bar 52 which is mounted on the block 50 so that it extends substantially perpendicularly outwardly with respect to the base 14. The mounting assembly 42 further comprises a mounting frame 53 including a pair of parallel frame members 54 which are pivotably mounted on the rod 52 and a cross-member 56 which extends between the parallel frame members 54. The print head 40 is mounted in the mounting frame 53 between the cross-member 56 and the outer ends of the frame members 54 as illustrated. The mounting assembly 42 further includes a spring mounting arm 58, a spring bar 60 and a plurality of coil springs 62. The spring mounting arm 58 is formed in an angle-iron configuration, and it is mounted on the base 14 so that it extends substantially perpendicularly outwardly therefrom. The spring bar 60 is disposed in the angular interior of the mounting arm 58, and the springs 62 are interposed between the horizontal leg of the mounting arm 58 and the spring bar 60 so that they are operative for biasing the spring bar 60 toward the platen 44. Vertically elongated apertures 64 are provided in the spring bar 60, and pins (not shown) extend outwardly from the vertical leg of the mounting arm 58 and are received in the apertures 64 for guiding the spring bar 60 in its vertical travel. The spring bar 60 is connected to the mounting frame 42 through a pair of first toggle elements 66 and an elongated second toggle element 68 having a film separator 69 thereon. In this regard, the first toggle elements 66 are pivotably connected to opposite ends of the spring bar 60 with pins 70 and the second toggle element 68 is pivotably connected between the ends of the arms 54 with pins 72. The first toggle elements 66 are pivotably connected to the second toggle element 68 adjacent opposite ends thereof with pins 73. The toggle elements 66 and 68 are operative between the actuated positions thereof illustrated in FIG. 3 and the unactuated positions thereof illustrated in FIG. 4. In this connection, when the toggle elements 66 and 68 are moved to the actuated positions thereof, they are pivoted toward the vertical leg of the mounting arm 58 so that they move the spring bar 60 against the springs 62 until the toggle elements 66 and 68 are moved slightly past the center or aligned position and engage the vertical leg of the mounting arm 58. This retains the toggle elements 66 and 68 in the actuated positions thereof while allowing the compression force of the springs 62 to be transmitted to the mounting frame 53 so that the print head 40 is resiliently urged toward the platen 44. On the other hand, when the toggle elements 66 and 68 are moved to the unactuated positions thereof, they are pivoted outwardly away from the vertical leg of the mounting arm 58 so that the toggle elements 66 and 68 are no longer retained in nearly aligned relation and so that the spring bar 60 is freely movable to release the compression of the springs 62. Further, once the toggle elements 66 and 68 have been moved past the center or aligned position, they are freely pivotable with a knee-like action to enable the frame 53 and the print head 40 to be pivoted away from the platen 44. A photocell sensor 74 is mounted on the base 14 adjacent the inner arm 54, and an interference strip 75 is provided on the inner arm 54. The strip 75 interferes with a light beam in the sensor 74 when the mounting assembly 42 is in the actuated position thereof but not when the assembly 42 is in the unactuated position thereof to provide an indication of the position of the assembly 42.

The first printing assembly 16 is identical to the second printing assembly 20 as hereinabove described, and hence, the first printing assembly 16 is not described separately herein. As illustrated in FIGS. 1 and 2, the first print head assembly 16 is positioned on the base 14 so that it is operative for applying images to the first or underside of the strip 12 at the first printing station 18 before the strip 12 passes to the second printing assembly 20 at the second printing station 22.

The feed assembly 24 is operative for guiding and advancing the strip 12 through the apparatus 10 so that is passes in a substantially taut disposition from the first printing station 18 to the second printing station 22. The feed assembly 24 comprises an inlet roller assembly generally indicated at 76, an intermediate guide generally indicated at 77, and a drive roller assembly generally indicated at 78. The inlet roller assembly 76 includes an inlet feed roller 80 having a rubberized outer casing thereon and a bracket 82 for mounting the roller 80 on the base 14. The inlet roller assembly 76 further comprises a conventional centering guide 84 including an adjustment screw 86, the centering guide 84 being operative for centering the strip 12 as it passes from the inlet feed roller 80. The intermediate centering guide 77 is identical to the centering guide 88, and it includes an adjustment screw 87. The intermediate centering guide 77 is mounted on the bracket 46 of the second feed assembly 20 so that it is positioned for centering the strip 12 as it passes from the second printing station 22 to the drive assembly 78. The drive assembly 78 comprises a drive roller 88 having a rubberized outer casing thereon, a pressure roller 90 also having a rubberized outer casing thereon, and a mounting bracket 92. The bracket 92 is mounted on the base 14, and the drive roller 88 and the pressure roller 90 are mounted in the bracket 92 so that they are substantially parallel to each other and substantially perpendicular to the base 14. Further, the pressure roller 90 is positioned in closely adjacent relation to the drive roller 88 so that when the drive roller 88 is rotated, the rollers 88 and 90 cooperate for advancing the strip 12 through the apparatus 10.

The stepping motor 26 comprises a conventional stepping motor, and it is drivingly connected to the drive roller 88 through a drive belt 94. The stepping motor 26 in the apparatus 10 as herein embodied is operative for rotating in stepped rotational increments of 1.8° each at a frequency of 500 hz., although the use of other types of stepping motors in the apparatus 10 is contemplated. However, it is important to note that the stepping motor 26 is operative at a uniform rate of stepped rotational increments per revolution in order to assure precise longitudinal orientation of the different images applied to the opposite sides of the strip 12 at the printing stations 18 and 22.

The first and second printing film drive assemblies 28 and 30 are operative for advancing the first and second printing films 34 and 36 to the first and second printing stations 18 and 20, respectively, so that the films 34 and 36 are interposed between the thermal print heads 40 at the printing stations 18 and 22 and the strip 12. In this regard, the printing films 34 and 36 comprise conventional thin polyester films having heat-sensitive coatings thereon, and they are responsive to heat from the thermal print heads 40 for transferring selected portions of the coatings thereon to the strip 12 to apply images to the opposite sides of the strip 12. The printing films 34 and 36 preferably have widths of between 1 and 4 inches and thicknesses of between $3\frac{1}{2}$ and 6 microns, and the heat-sensitive coatings thereon are oriented so that they face the strip 12 at the printing stations 18 and 22, respectively, for applying images thereto. The film drive assemblies 28 and 30 each comprise a film supply spool 96 (illustrated in FIG. 1) containing a supply of film 34 or 36 and mounted on a hub 98, and a film takeup spool 100 (illustrated in FIG. 1) which is mounted on a hub 102. The hubs 98 are mounted on the base 14, and they are operative for applying slight resistances to the rotation of the supply spools 96 in order to maintain the strips 34 and 36 in substantially taut dispositions as they are passed over the print heads 40. The hubs 102 are also mounted on the base 14, and they are drivingly connected to motors 104 through slip clutches 106 and drive belts 108. During operation of the apparatus 10, the drive motors 104 are operated to rotate the take-up spools 100 in order to advance the films 34 and 36 through the printing stations 18 and 22, respectively. However, the slip clutches 106 are designed so that they are increasingly slip as the wound diameters of the films 34 and 36 on the take-up spools 100 are increased in order to maintain substantially constant film speeds through the apparatus 10. The film supply assemblies 28 and 30 further comprise conventional film centering guides 109 having adjustment screws 110 which are operative for adjusting the positions of the films 34 and 36 at the printing stations 18 and 22.

Figure 5:
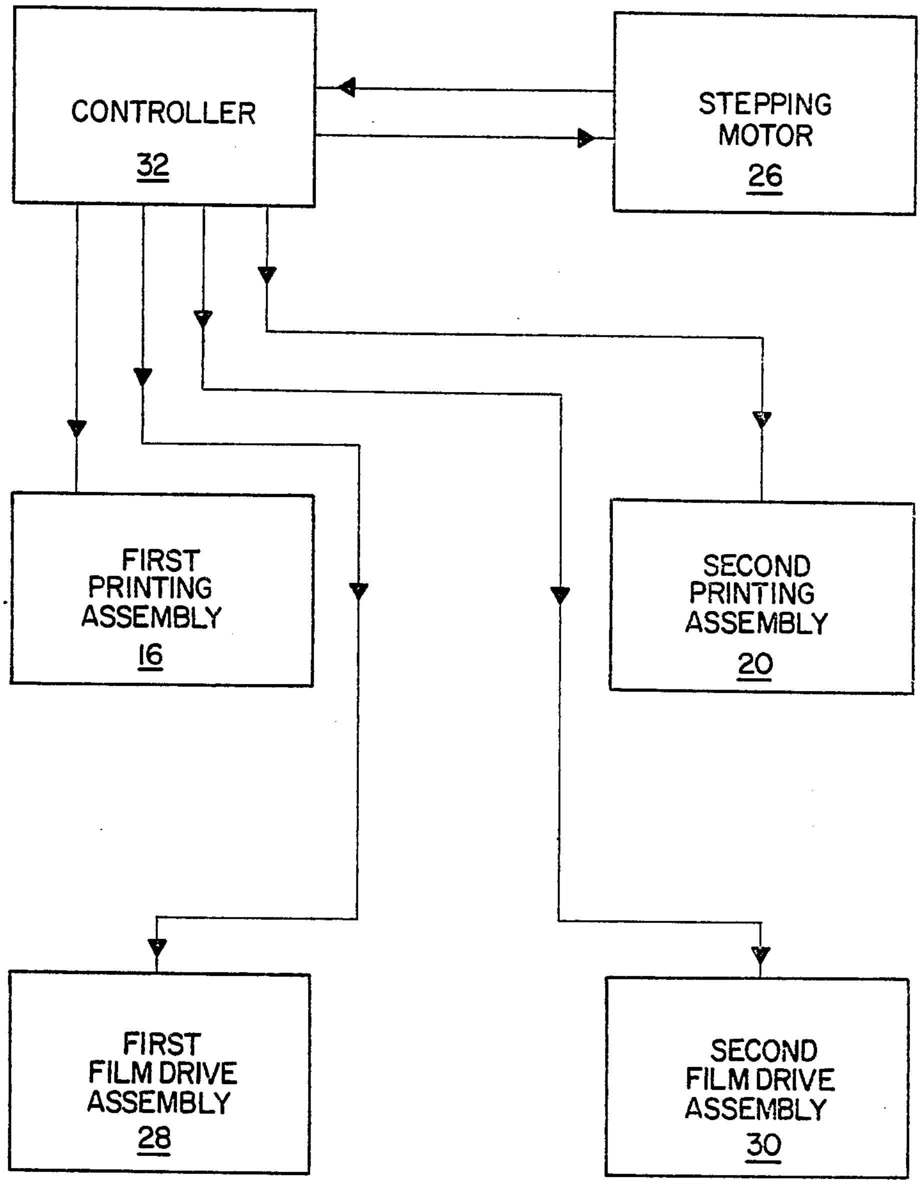
FIG. 5 is an operational schematic view of the apparatus.

Referring now to FIG. 5, the operation of the controller 32 is illustrated. In this regard, the controller 32 comprises a conventional electronic controller including a microprocessor which is programmable by conventional techniques for controlling the operation of the stepping motor 26, the first and second printing assemblies 16 and 20, respectively, and the first and second film drive assemblies 28 and 30, respectively. The controller 32 is programmed so that it is responsive to a predetermined number of stepped rotational increments of the stepping motor 26 for coordinating the energizations of the print heads 40 in the first and second printing assemblies 16 and 20, respectively. More specifically, the controller 32 is operative for actuating the first printing assembly 16 to apply a first image to the first or underside of the strip 12 at the first printing station 18 and for then actuating the second printing assembly 20 to apply a second image to the second or upper side of the strip 12 at the second printing station 22 after the passage of a predetermined number of stepped rotational increments of the stepping motor 26 which corresponds to the distance between the two printing stations 18 and 22. In other words, the controller 32 is operative for coordinating the longitudinal positions of the images which are applied to the opposite sides of the strip 12 at the printing stations 18 and 22 by responding to a predetermined number of stepped rotational increments of the stepping motor 26 which corresponds to the distance between the two printing stations 18 and 22 rather than responding to the passage of time. Accordingly, minor variations in the rotational speed of the stepping motor 26 have no effect on the longitudinal positions of the images which are applied to the opposite sides of the strip 12. Further, minor errors in the positions of the images which are applied to the opposite sides of the strip 12 are not compounded over the longitudinal extent of the strip 12 so that the positions of the images can be coordinated with a high degree of accuracy along the entire extent of the strip 12.

The controller 32 is also operative for controlling the the first and second film drive assemblies 28 and 30 so that the films 34 and 36 are passed through the printing stations 18 and 22, respectively, as the strip 12 is advanced through the printing apparatus 10. Further, the controller 32 is responsive to the sensors 74 on the print head mounting assemblies 42 for actuating the appropriate film drive assembly 28 or 30 to advance the respective film 34 or 36 thereof for a short period of time when a print head mounting assembly 42 is initially moved to an unactuated position. Accordingly, the actuated film drive assembly 28 or 30 operates to clear the appropriate film 34 or 36 from the path of the strip 12 to provide substantially open access to the path of the strip 12 where it passes over the adjacent platen 44.

It is seen, therefore, that the instant invention provides a significant improvement in printing apparatus of the type utilized for applying images to the opposite sides of continuous strips. In this connection, by utilizing a stepping motor for advancing a strip through the apparatus and by utilizing a controller which is responsive to the stepped rotational increments of the stepping motor for coordinating the printing operation at the second printing station with the printing operation at the first printing station, it is possible to precisely control the longitudinal positions of the images which are applied to the opposite sides of the strip with the apparatus. Further, by utilizing print head mounting assemblies comprising toggle members which are operative between actuated and unactuated positions, it is possible to more easily move the print heads of the apparatus away from their respective platens to clear the paper path, etc. Accordingly, it is seen that the printing apparatus fo the instant invention and the print head mounting assemblies thereof represent significant advancements in the art which have substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An apparatus for applying images to opposite first and second sides of a continuous strip comprising:

a. first printing means actuatable for applying a first image to the first side of said strip at a first printing station;

b. second printing means actuatable for applying a second image to the second side of said strip at a second printing station which is a predetermined distance from said first printing station;

c. drive means including a rotatable drive roller, said drive means being operative upon rotation of said drive roller for longitudinally advancing said strip so that it passes in a substantially taut disposition from said first printing station to said second printing station;

d. stepping motor means rotatable at a predetermined fixed rate of stepped rotation increments per revolution for rotating said drive roller to advance said strip; and e. means responsive to a predetermined number of stepped rotational increments of said stepping motor means corresponding to the distance between said first and second printing stations for actuating said first and second printing means to apply said first and second images to the first and second sides of said strip.

2. In the apparatus of claim 1, said first printing means further characterized as first thermal printing means comprising a first thermal print head at said first printing station and means for advancing a first thermal printing film to said first printing station so that said first thermal printing film is interposed in engagement between said first thermal print head and said first side of said strip at said first printing station, said second printing means further characterized as second thermal printing means comprising a second thermal print head at said second printing station and means for advancing a second thermal printing film to said second printing station so that said second thermal printing film is interposed in engagement between said second thermal print head and said second side of said strip at said second printing station.

3. In the apparatus of claim 2, said first printing means further comprising a first platen, said strip and said first thermal printing film passing between said first thermal print head and said first platen, and means biasing said first thermal print head toward said first platen, said second printing means further comprising a second platen, said strip and said second thermal printing film passing between said second thermal print head and said second platen, and means biasing said second thermal print head toward said second platen.

4. The apparatus of claim 2 further comprising a first mounting assembly for mounting said first thermal print head at said first printing station, said first mounting assembly comprising at least two pivotably connected toggle elements alternatively positionable in actuated positions wherein they are releasably secured in substantially aligned relation and unactuated positions wherein they are in nonaligned relation and pivotable with respect to each other and biasing means communicating with said first thermal print head through said toggle elements when said toggle elements are in the actuated positions thereof for biasing said first thermal print head toward said first platen.

5. The apparatus of claim 4 further comprising a base, said first platen and said first mounting assembly being mounted on said base, said first mounting assembly further comprising a mounting frame pivotably mounted on said base, said first thermal print head being mounted on said first mounting assembly so that it is pivotable therewith toward and away from said platen.

6. In the apparatus of claim 5, one of said toggle elements being attached to said mounting frame, said mounting frame pivoting to move said first thermal print head away from said platen when said toggle elements are moved to said unactuated positions thereof from said actuated positions thereof.

7. The apparatus of claim 6 further comprising means responsive to movement of said toggle elements from the actuated positions thereof to the unactuated positions thereof for actuating said advancing means to advance said film a predetermined amount so that said film is maintained in a substantially taut disposition when said toggle elements are moved to the unactuated positions thereof.

8. In a thermal printing apparatus of a type including a base, a platen mounted on said base, a thermal print head and a thermal print head mounting assembly on said base, said thermal print head mounting assembly mounting said thermal print head so that it is operable in an actuated position wherein it is biased toward said platen and operative for thermally applying images to a continuous strip as said strip is passed between said thermal print head and said platen, the improvement comprising said thermal print head mounting assembly comprising toggle means including at least two pivotably connected toggle elements alternatively positionable in actuated positions wherein they are releasably secured in substantially aligned relation and unactuated positions wherein they are in nonaligned relation and pivotable with respect to each other and biasing means communicating with said print head through said toggle elements when said toggle elements are in the actuated positions thereof for biasing said print head toward said platen.

9. In the thermal printing apparatus of claim 8, said mounting assembly further comprising a mounting frame pivotably mounted on said base, said print head being mounted on said mounting assembly so that it is pivotable therewith toward and away from said platen.

10. In the thermal printing apparatus of claim 9, one of said toggle elements being attached to said mounting frame, said mounting frame pivoting to move said print head away from said platen when said toggle elements are moved to said unactuated positions thereof from said actuated positions thereof.

11. The thermal printing apparatus of claim 8 further comprising a continuous thermal printing film interposed between said print head and said continuous strip at said printing station and operative for applying images to said strip in response to selective energization of said thermal print head, means for advancing said thermal printing film so that it passes between said thermal print head and said continuous strips at said printing station and means responsive to movement of said toggle elements from the actuated positions thereof to the unactuated positions thereof for actuating said advancing means to advance said film a predetermined amount so that said film is maintained in a substantially taut disposition when said toggle elements are moved to the unactuated positions thereof.

* * * * *